(12) United States Patent
Baltz et al.

(10) Patent No.: US 6,469,906 B1
(45) Date of Patent: Oct. 22, 2002

(54) OPTICAL TRANSCEIVER ADAPTATION

(75) Inventors: Jeremy J. Baltz, Mountain View, CA (US); Michael Francis Hanley; Darwin Lee Koerber, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/654,033

(22) Filed: Sep. 1, 2000

(51) Int. Cl.[7] .................................................. H05K 7/02
(52) U.S. Cl. ...................... 361/760; 361/816; 361/818; 174/35 R
(58) Field of Search ..................... 439/92, 95; 385/92; 361/728, 816, 818, 760; 174/35 R

(56) References Cited

U.S. PATENT DOCUMENTS

| | | | | |
|---|---|---|---|---|
| 4,993,803 A | * | 2/1991 | Suverson et al. | |
| 5,602,860 A | * | 2/1997 | Masonson | 372/34 |
| 5,984,731 A | * | 11/1999 | Laity | 439/676 |
| 6,135,793 A | * | 10/2000 | Babineau | 439/92 |
| 6,142,802 A | * | 11/2000 | Berg et al. | 439/180 |
| 6,178,096 B1 | * | 1/2001 | Flickinger et al. | 361/816 |
| 6,220,873 B1 | * | 4/2001 | Samela et al. | 439/76.1 |
| 6,267,606 B1 | * | 7/2001 | Poplawski et al. | 439/92 |

* cited by examiner

*Primary Examiner*—David S. Martin
*Assistant Examiner*—Thanh S. Phan
(74) *Attorney, Agent, or Firm*—Christopher H. Lynt; Matthew J. Bussan

(57) ABSTRACT

An adapter for adapting a first circuit package to a second circuit packaging, includes a substrate for receiving the first circuit package thereon, a plurality of connectors disposed on the substrate configured in the form of the second circuit packaging, and interconnections on the substrate for interconnecting the first circuit package to the plurality of connectors. At least one electronic component may also be disposed on the substrate and interconnected with the first transceiver package and the second transceiver packaging. An insulator pad may be provided for electrically insulating the adapter circuitry from an electrical system circuit board on which the adapter is mounted. A metal cover provides a chassis ground.

19 Claims, 7 Drawing Sheets

OPTICAL TRANSCEIVER ADAPTATION

BACKGROUND OF THE INVENTION

1. Field of the Invention

The invention relates to the field of optical transceiver packaging, and adapting a first transceiver package to a second transceiver package, in particular adaptation of a small form factor (SFF) optical transceiver package to a 1×9 optical transceiver package application.

2. Background Information

A number of integrated circuit (IC) packaging forms are known in the art, including dual in-line pin or DIP and single in-line pin (SIP) packaging, among others. The type of packaging used for a particular IC application may depend on a variety of factors relating to component layout, existing IC packaging, production equipment, and the like. Once an IC component is chosen, original equipment manufacturers (OEM's), circuit board designers, etc., base their designs on the type of packaging used for the particular IC component chosen. Disadvantageously, however, a circuit board designed for a particular DIP IC would have to be redesigned if a different IC having a different type of packaging, e.g., SIP, was to be used. Of course, besides the packaging, the particular function for each pin, the signal levels required, and the supply voltage used, for example, may vary from IC to IC. The packaging include pin location and pin function, and defines a particular device's footprint or pin out.

From the point of view of the IC manufacturer, once their IC has been accepted in the marketplace in a particular package configuration, the demand for the product in that package weighs against changing the packaging. Also, a potential competitor experiences pressure to conform to the established product package configuration to gain any market share for their competing product. From the point of view of the OEM purchaser of an IC, competition is good because it tends to drive down their costs, and helps to ensure alternate supplies are available.

However, sometimes a situation occurs where there are comparable IC components with different packaging each having a substantial share of the market. This may occur when a company is both an IC manufacturer and a manufacturer of systems using the IC. The company may find it advantageous to use a unique packaging in their equipment designs to control the market for replacement parts. This may be for engineering reasons, i.e., to prevent the use of lower quality components which would degrade the equipment operation, or for economic reasons, i.e., to get a lock on the market for replacement parts.

This strategy may have unintended negative effects, however, since a design with a single source of replacement parts may be less desirable to the end user, since it could lead to shortages and extended down times. Further, the part with the unique packaging cannot compete with already established functional equivalents having a different design. Whatever the reason for selecting a particular packaging, potential market share for an IC may be unrealized because of the particular packaging selected, as in the example where other incompatible packaging is in use in functionally comparable IC's. Just such a situation exists in the optical transceiver marketplace where there are two incompatible packages used, i.e., the small form factor (SFF) 2×5 or 2×6 dual in-line packaging, and the 1×9 single in-line packaging.

Therefore, a need exists for a way to overcome such packaging limitations so that competition is enhanced and the market for a particular product is expanded. In particular, this need exists in the rapidly emerging field of optical communications and related devices.

There may be other differences between devices besides the packaging, such as signal levels and supply voltages required. It would be advantageous to adapt these other differences at the same time the packaging is adapted.

SUMMARY OF THE INVENTION

It is, therefore, a principle object of this invention to provide a scheme to adapt a first IC packaging, e.g., a small form factor (SFF) 2×5 or 2×6 optical transceiver packaging, to a second IC packaging, e.g., a 1×9 optical transceiver package.

It is another object of the invention to provide a method and apparatus that solves the above mentioned problems so that such differently packaged but functionally equivalent devices can be interchanged.

These and other objects of the present invention are accomplished by the method and apparatus disclosed herein.

Advantageously, the invention provides a significant opportunity to get into the 1×9 optical transceiver market by adapting existing small form factor (SFF) products to a 1×9 transceiver footprint or pin out. Using the adapter according to an embodiment of the invention, a manufacturer who is not currently in the 1×9 transceiver market could enter that market with relatively little development expense, and possibly steer potential customers toward its SFF product line.

According to an aspect of the invention, an adapter for adapting a first circuit package to a second circuit packaging, is provided having a substrate for receiving the first circuit package thereon, a plurality of connectors disposed on the substrate configured in the form of the second circuit packaging, and interconnect means on the substrate for interconnecting the first circuit package to the plurality of connectors.

According to another aspect of the invention, the first circuit package comprises a first transceiver package, and the second circuit packaging comprises a second transceiver packaging.

According to another aspect of the invention, the first transceiver package comprises a small form factor package, and the second transceiver packaging comprises a 1×9 packaging.

According to another aspect of the invention, at least one electronic component is disposed on the substrate and interconnected with the first transceiver package and the second transceiver packaging.

According to another aspect of the invention, the at least one electronic component comprises at least one voltage regulator.

According to another aspect of the invention, the at least one electronic component comprises at least one signal level translation means for translating input and output signals between a first signal level associated with the first transceiver package and a second signal level associated with the second transceiver packaging.

According to another aspect of the invention, a metal cover for providing a ground contact is provided.

According another aspect of the invention, the adapter is for mounting on an electrical system circuit board, and further comprises an insulator pad for electrically insulating the at least one electronic component disposed on the substrate from the electrical system circuit board.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
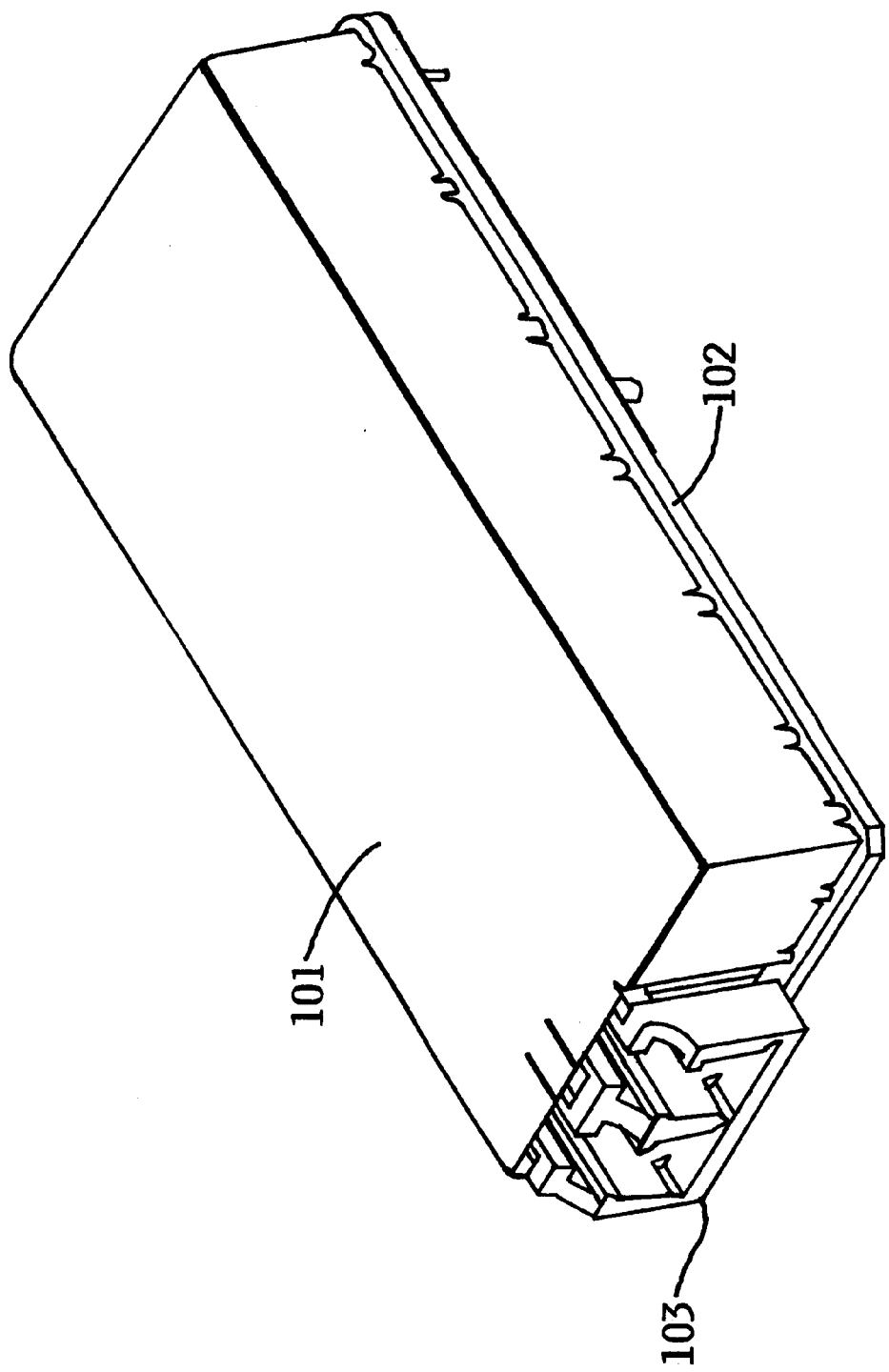
FIG. 1 illustrates an adapter according to an exemplary embodiment of the present invention.
Figure 2:
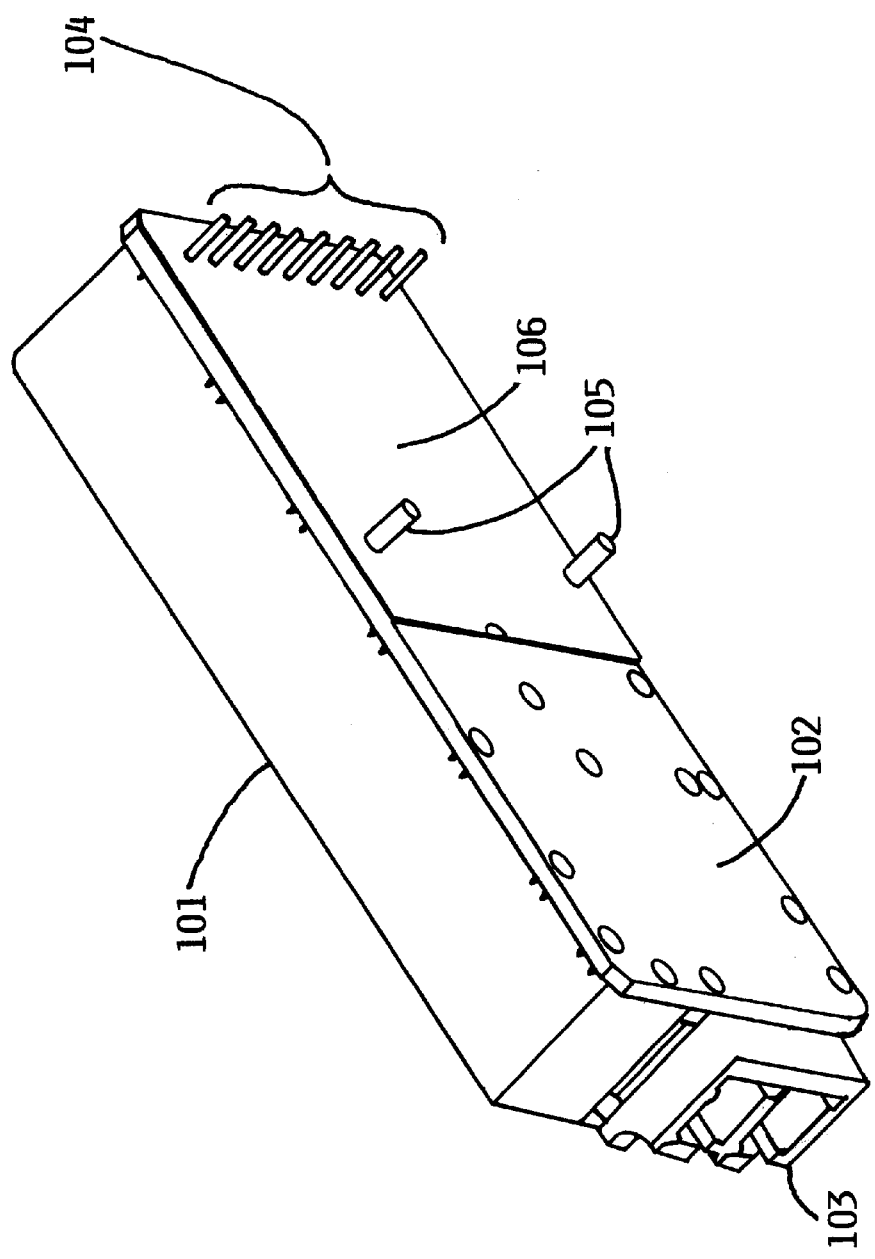
FIG. 2 illustrates a bottom view of the adapter of FIG. 1 according to an exemplary embodiment of the invention.

FIGS. 1 and 2 are two different views of an adapter assembly according to an exemplary embodiment of the invention. The embodiment shown and described in detail below, is for adapting a small form factor (SFF) optical transceiver to a 1×9 optical transceiver application. However, the invention has broader applications, as will be apparent to one skilled in the art.

In both FIGS. 1 and 2, a metal cover 101 is disposed on an adapter card substrate 102 and covering a small form factor (SFF) module 103. In FIG. 2, connecting pins are visible at the bottom of the substrate 102. In particular, 1×9 form factor pins 104 and 1×9 chassis ground pins 105 can be seen. An insulator pad 106 is disposed on the bottom of the substrate 102 in at least one area to insulate the adapter assembly from any circuit wiring or the like that might be present on a circuit board (not shown) on which the adapter assembly is to be mounted.

Figure 3:
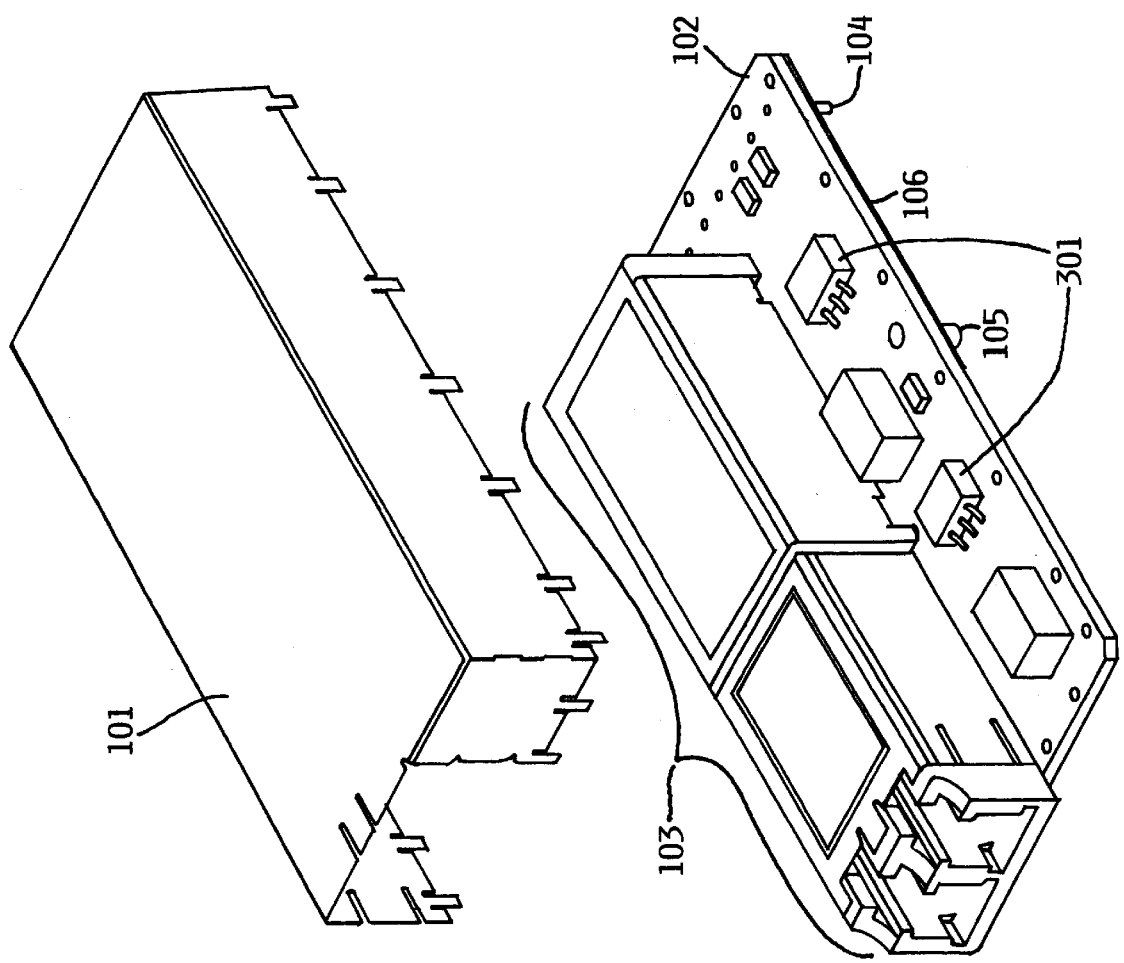
FIG. 3 illustrates the adapter of FIGS. 1 and 2 with the cover removed according to an exemplary embodiment of the invention.

As can be better seen in FIG. 3, the substrate 102 is in the form of a simple printed circuit board that is fitted with necessary electronic components, e.g., 5 volt to 3 volt regulators 301 to regulate power, and coupling capacitors to translate input and output signal levels between the SFF module 103 and the 1×9 pin header 104. The adapter assembly is fitted with a metal cover 101 to provide chassis ground contact with the SFF module 103.

Figure 4:
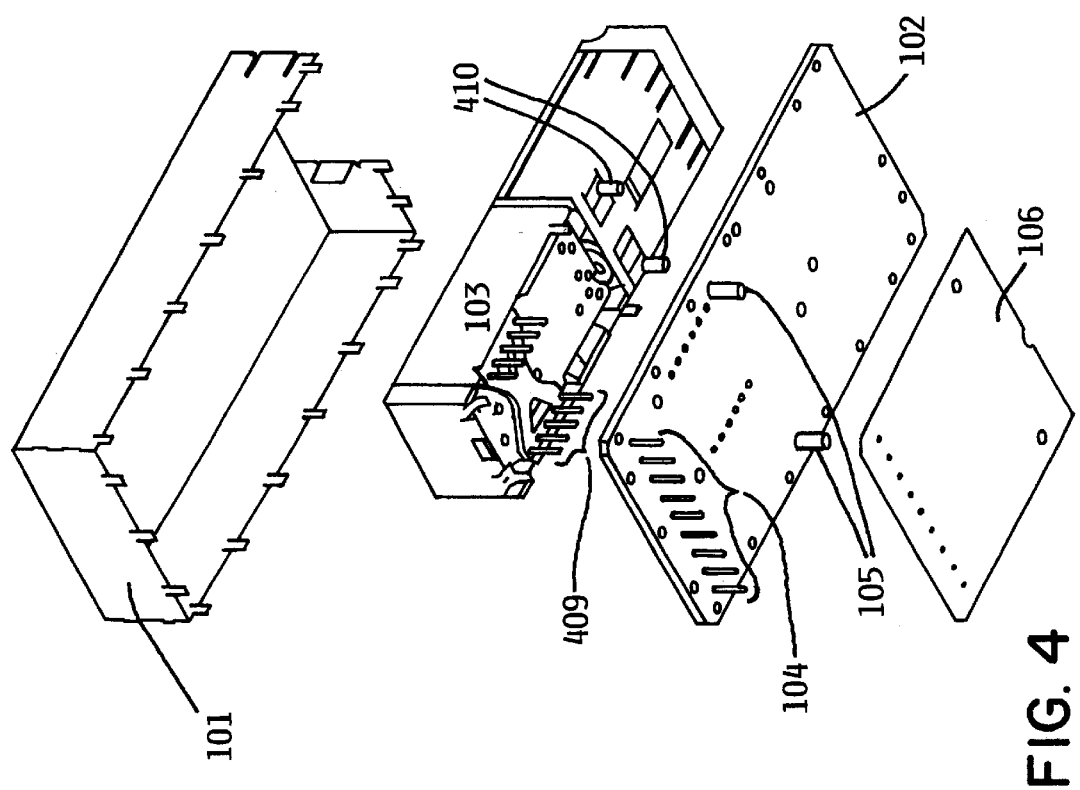
FIG. 4 illustrates an exploded view of the adapter assembly of FIGS. 1–3, according to an exemplary embodiment of the invention.

In FIGS. 1, 2 and 3, the SFF module 103 can be seen protruding out the front end of the metal cover 101. FIG. 4 shows an exploded view of the assembly from the bottom of the assembly. In FIG. 4, the pins 104 that are arranged in the 1×9 transceiver form factor and the chassis ground pins 105 can be seen. An insulator pad 106 is applied to the bottom of the adapter card substrate 102 in the region of these pins 104 and 105 to prevent possible electrical shorting between the adapter assembly and any exposed circuitry on the circuit board on which it will be mounted.

The SFF module 103 can be seen in FIG. 4 as having 2×5 (or 2×6) connecting pins 409 as well as ground pins 410. The substrate 102 has corresponding holes for receiving these pins when the SFF module 103 is mounted thereon, as in FIG. 3. The substrate 102 of course also has interconnecting circuitry on at least one surface (not shown) for connecting the SFF module 103 with the 1×9 form factor pins 104 and ground pins 105, through interface circuitry, e.g., voltage regulators 301. An example of such circuitry is shown schematically in FIG. 5.

Figure 5A:
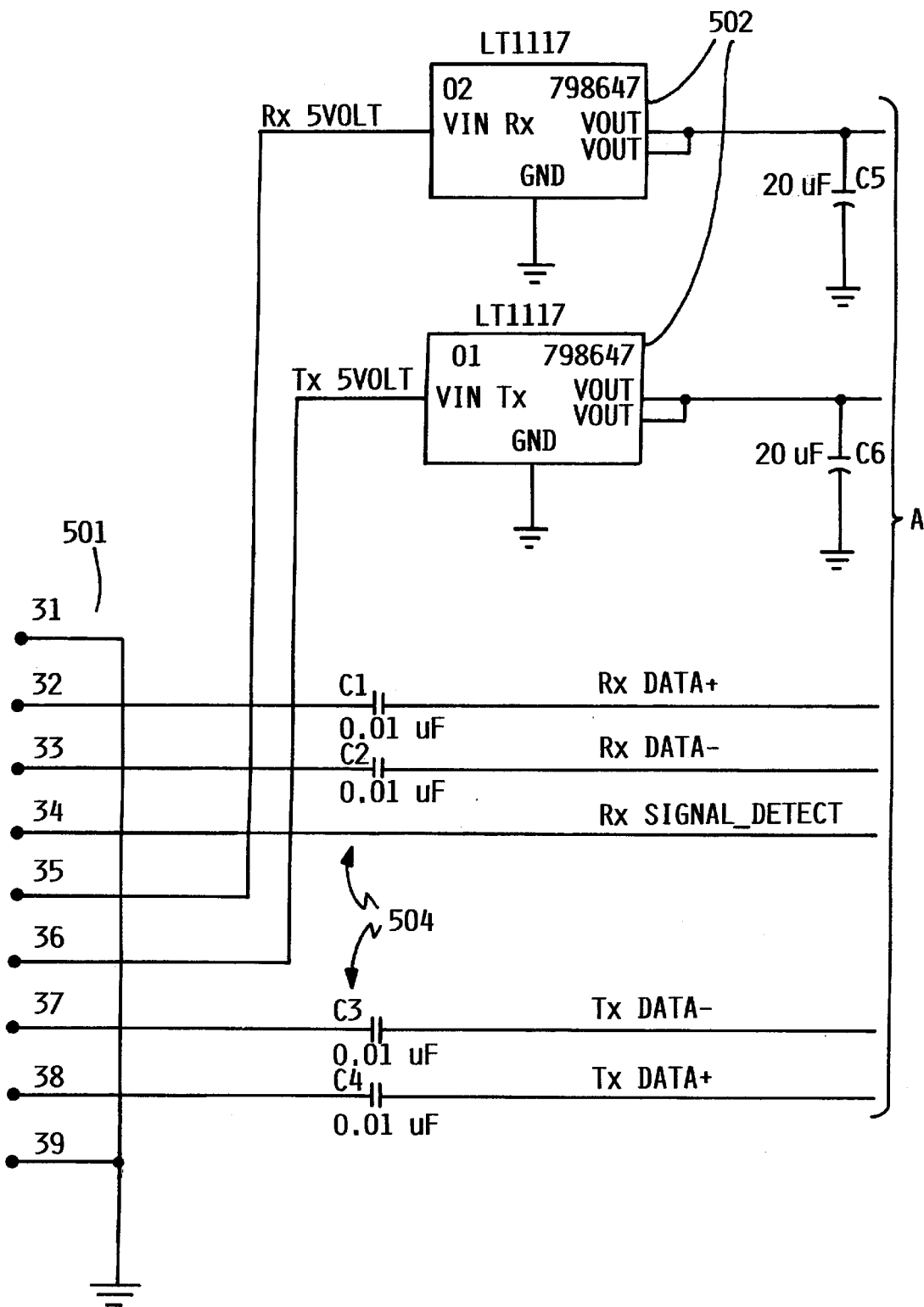
FIG. 5 is a circuit diagram of an adapter according to an exemplary embodiment of the invention.
Figure 5B:
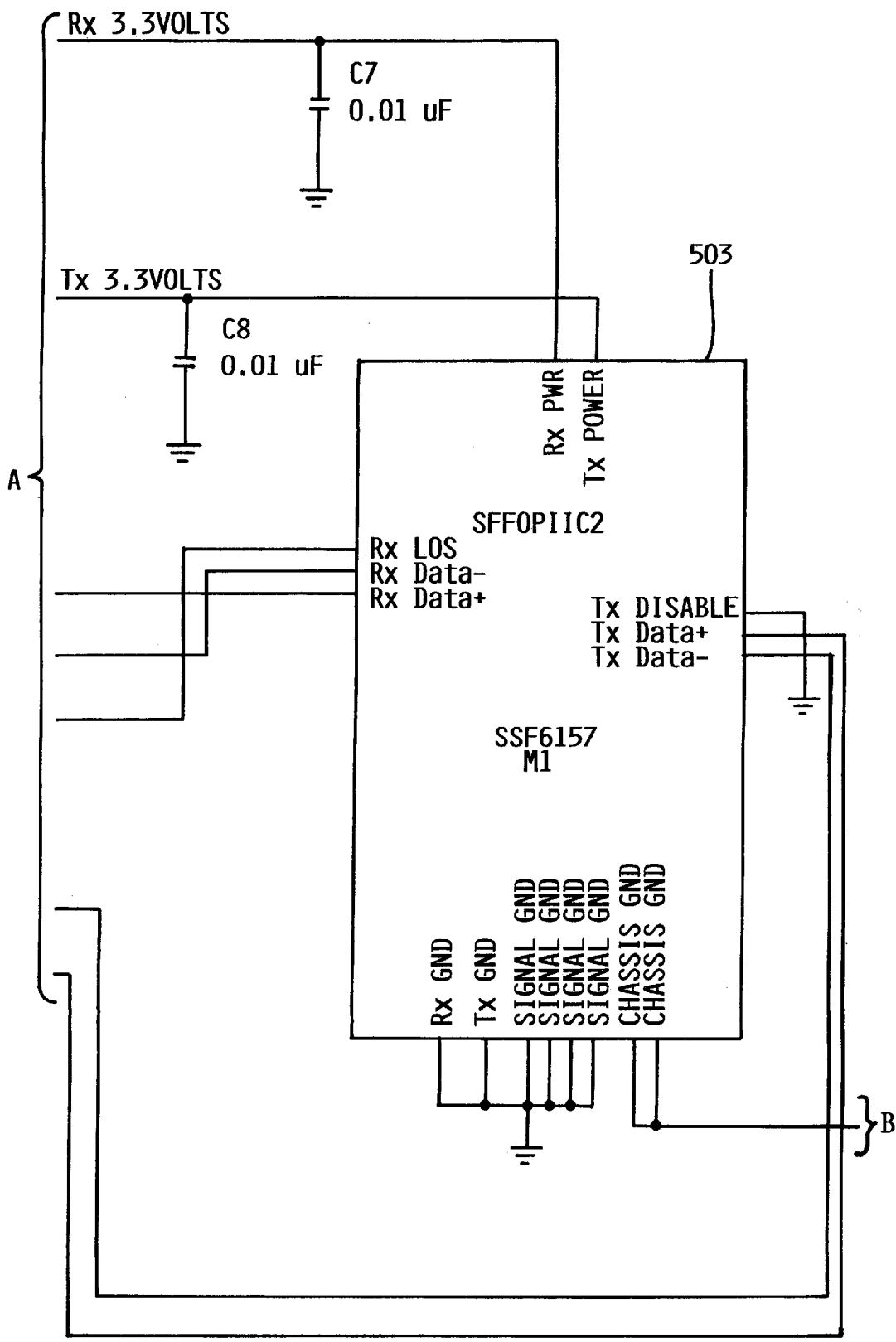
Figure 5C:
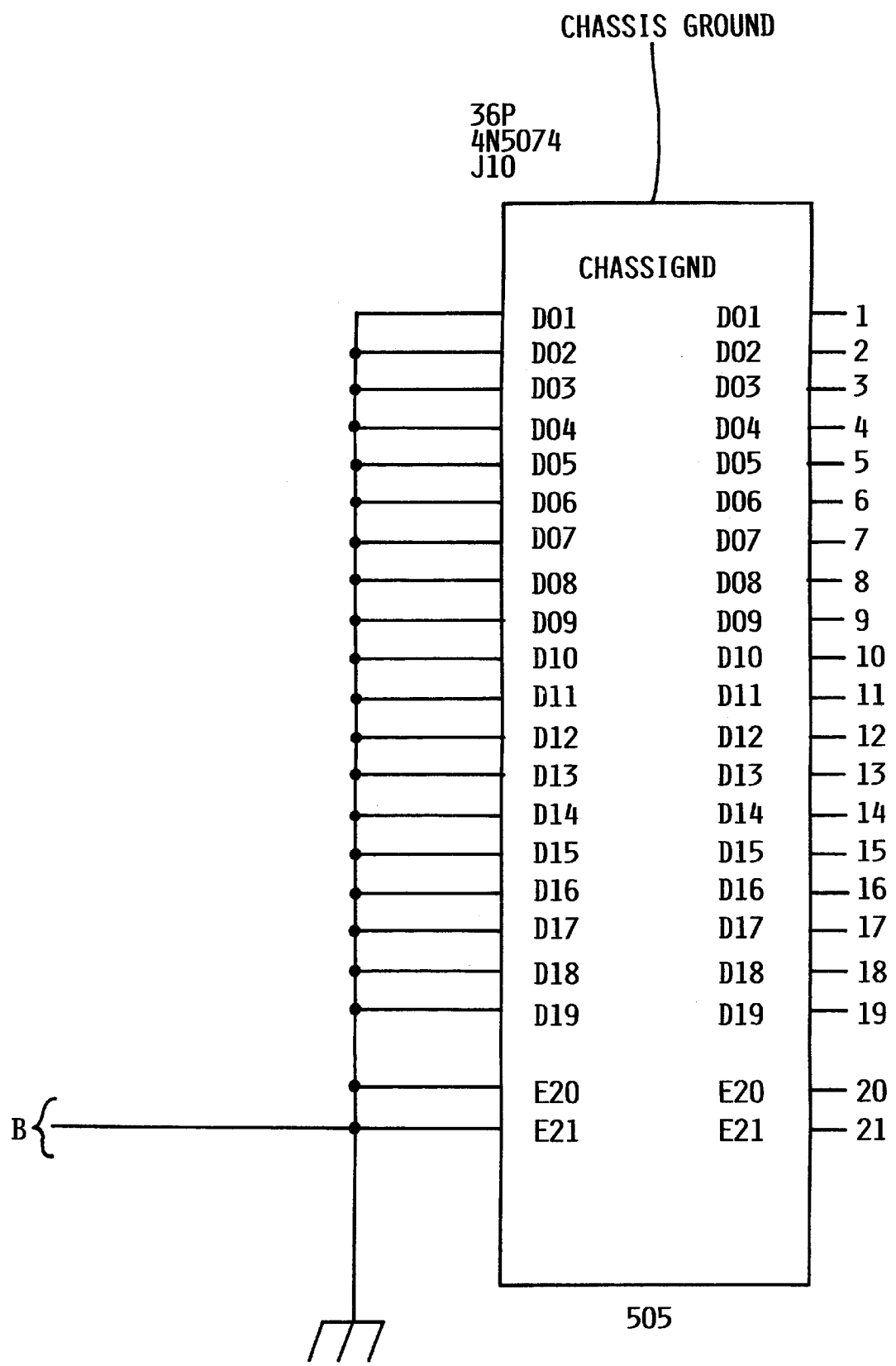

At the left side of FIG. 5, a 1×9 connector 501 is shown. Two of the pins provide 5 volts input power for a transmitter and a receiver section of the transceiver, respectively. This 5 volts must be reduced to 3 volts by regulators 502 since the SFF optical transceiver 503 uses 3 volts.

Transmit and receive data pins of the 1×9 connector are AC coupled to the corresponding SFF module pins through coupling capacitors 504 which eliminate DC voltages on these signal lines.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. An adapter for adapting a first optoelectronic transceiver module having a first circuit package to a second optoelectronic transceiver module having a second circuit packaging, the first optoelectronic transceiver module having a form factor package smaller than that of the second optoelectronic transceiver module, comprising:

a substrate for receiving the first optoelectronic transceiver module thereon;

a plurality of connectors disposed on the substrate configured in the form of the second circuit packaging of the second optoelectronic transceiver module;

interconnect means on the substrate for interconnecting the first circuit package to the plurality of connectors; and a cover mounted on the substrate and forming a portion of the form factor package of the second optoelectronic tranceiver module and covering the first optoelectronic transceiver module when the first optoelectronic transceiver module is received on the substrate, thereby forming a module-in-module arrangement.

2. The adapter according to claim 1, wherein the first transceiver package comprises a small form factor package, and the second transceiver packaging comprises a 1×9 packaging.

3. The adapter according to claim 1, further comprising:

at least one electronic component disposed on the substrate and interconnected with the first transceiver package and the second transceiver packaging.

4. The adapter according to claim 3, wherein the at least one electronic component comprises at least one voltage regulator.

5. The adapter according to claim 3, wherein the at least one electronic component comprises at least one signal level translation means for translating input and output signals between a first signal level associated with the first transceiver package and a second signal level associated with the second transceiver packaging.

6. The adapter according to claim 3, wherein the adapter is for mounting on an electrical system circuit board, and further comprising an insulator pad for electrically insulating the first circuit package and the at least one electronic component disposed on the substrate from the electrical system circuit board.

7. The adapter according to claim 1, wherein the cover comprises a metal cover for providing a ground contact.

8. A method of adapting an electronic device having a first packaging to a second different packaging standard comprising utilizing the adapter according to claim 1.

9. An adapter assembly, comprising:
   a substrate having a first surface with a first set of electrical contacts thereon, and a second surface with a second different set of electrical contacts thereon configured as a second type of packaging connectors of a second optelectronic transceiver module having a second packaging, the first and second sets of electrical contacts being electrically interconnected by connection circuitry on the substrate;
   a first optoelectronic transceiver module having a first packaging with a first type of packaging connectors, mounted on the first surface of the substrate, the first type of packaging connectors being in electrical contact with the first set of electrical contacts on the substrate, the first optoelectronic transceiver module having a form factor package smaller than that of the second optoelectronic transceiver module; and
   a cover mounted on the substrate and forming a portion of the form factor package of the second optoelectronic tranceiver module and covering the first optoelectronic transceiver module, thereby forming a module-in-module arrangement.

10. The adapter assembly according to claim 9, wherein the cover is metal and is mounted on the first surface of the substrate.

11. The adapter assembly according to claim 10, further comprising:
   an insulator pad mounted on a second surface of the substrate opposite the first surface of the substrate.

12. The adapter assembly according to claim 11, wherein the second different set of electrical contacts comprise a plurality of single in-line pins.

13. The adapter assembly according to claim 12, wherein the first optoelectronic transceiver module first type of packaging connectors comprise a plurality of dual in-line pins and wherein the first set of electrical contacts comprise a plurality of dual in-line holes for receiving the dual in-line pins.

14. The adapter assembly according to claim 13, further comprising a plurality of ground pins disposed on the second surface of the substrate.

15. The adapter assembly according to claim 14, wherein the connection circuitry on the substrate comprises:
   at least one regulator for receiving an input voltage through at least one of the plurality of single in-line pins and providing a different voltage to the first optoelectronic transceiver module through at least one of the dual in-line holes.

16. The adapter assembly according to claim 15, wherein the connection circuitry on the substrate further comprises:
   at least one coupling capacitor connected between at least one of the plurality of single in-line pins and at least one of the dual in-line holes.

17. The adapter assembly according to claim 16, wherein the first optoelectronic transceiver module comprises a small form factor optical transceiver.

18. The adapter assembly according to claim 17, wherein the plurality of dual in-line holes comprises at least ten holes, wherein the plurality of single in-line pins comprises at least nine pins, and wherein the plurality of ground pins comprises at least two ground pins.

19. A method of adapting an electronic device having a first type of packaging to a second different type of packaging comprising utilizing the adapter assembly according to claim 9.

* * * * *